United States Patent [19]
Aoki et al.

[11] Patent Number: 6,099,766
[45] Date of Patent: Aug. 8, 2000

[54] METHOD AND APPARATUS FOR FORMING PREFORMS WITH CRYSTALLIZED NECKS

[75] Inventors: Daiichi Aoki; Kouhei Koga; Tsuyoshi Matsui, all of Ueda, Japan

[73] Assignee: Nissei ASB Machine Co., Ltd., Nagano-ken, Japan

[21] Appl. No.: 09/053,418

[22] Filed: Apr. 1, 1998

[30] Foreign Application Priority Data

Apr. 4, 1997 [JP] Japan ................................. 9-102740

[51] Int. Cl.⁷ ................................................. B29C 49/64
[52] U.S. Cl. .................... 264/39; 264/535; 264/538; 264/908; 425/526; 425/533; 425/534
[58] Field of Search ................................ 425/533, 526, 425/534, 548; 264/908, 535, 537, 538, 39

[56] References Cited

U.S. PATENT DOCUMENTS

| | | |
|---|---|---|
| 3,929,954 | 12/1975 | Valyi . |
| 3,944,643 | 3/1976 | Sato et al. ................................. 425/526 |
| 4,018,860 | 4/1977 | Farrell ......................................... 264/39 |
| 4,476,084 | 10/1984 | Takada et al. ............................ 264/908 |
| 4,564,497 | 1/1986 | Ota et al. ................................... 425/526 |
| 4,846,656 | 7/1989 | Denis et al. .............................. 264/908 |
| 5,232,715 | 8/1993 | Fukai ....................................... 425/548 |

FOREIGN PATENT DOCUMENTS

| | | | |
|---|---|---|---|
| 202973 | 11/1986 | European Pat. Off. ................ | 264/908 |
| 62-25491 | 6/1987 | Japan . | |
| 5-77310 | 3/1993 | Japan ..................................... | 264/908 |
| 7-285181 | 10/1995 | Japan . | |

OTHER PUBLICATIONS

Patent Abstracts of Japan, vol. 007, No. 189 (M–237), Aug. 18, 1983 (of JP 58 092535—Toyo Seikan Kaisha, Ltd.).
Patent Abstracts of Japan, vol. 010, No. 265 (M–515), Sep. 10, 1986 (of JP 61 089014—Nissei ASB Kikai KK).
Patent Abstracts of Japan, vol. 007, No. 215 (M–244), Sep. 22, 1983 (of JP 58 110221—Nippon Ester Co. Ltd.).
Patent Abstracts of Japan, vol. 014, No. 506 (M–1044), Nov. 6, 1990 (of JP 02 209219—Toyo Seikan Kaisha, Ltd.).
Patent Abstracts of Japan, vol. 007, No. 221 (M–246), Sep. 30, 1983 (of JP 58 114922—Nippon Ester Co. Ltd.).
Patent Abstracts of Japan, vol. 1998, No. 03, Feb. 27, 1998 (of JP 09 300438—Aokiko Kenyusho KK).

*Primary Examiner*—Robert Davis
*Attorney, Agent, or Firm*—David L. Hofman; Cislo & Thomas LLP

[57] ABSTRACT

A preform molding method and apparatus which can utilize a part of an injection mold to crystallize a neck of a preform. A rotary disc includes a plurality of neck cavity molds. An injection molding station, first heating station, second heating station and cooling/removing station are located at the respective positions where the neck cavity molds stops. The injection molding station injection molds a preform having a neck. The preform is sequentially conveyed the first and second heating stations while being held by neck cavity molds at the neck. Each of the heating stations heats the neck cavity molds so that the neck of the preform is heated up to a temperature of crystallization. Thereafter, the cooling/removing station cools the neck cavity molds. After the cooling step, the preforms are released and removed from the neck cavity molds. Thereafter, the neck cavity molds are returned to the injection molding station.

23 Claims, 10 Drawing Sheets

METHOD AND APPARATUS FOR FORMING PREFORMS WITH CRYSTALLIZED NECKS

BACKGROUND OF THE INVENTION

1. Field of Industrial Application

The present invention relates to a method and apparatus for forming a cylindrical closed-end preform which can be used to blow mold a synthetic resin vessel. More particularly, the present invention concerns a method and apparatus for injection molding a preform having a crystallized neck by utilizing a neck cavity mold in the injection molding step.

2. Description of the Prior Art

There is known a particular method of molding a heat-resistant bottle by crystallizing a non-orientated or extremely low-orientated area of the bottle or a preform used to form the bottle, which is called a neck or mouth portion. Such a method has been practiced particularly for bottles of polyethylene terephthalate (PET) which have been used to receive high-temperature materials.

In such neck crystallization, heaters are disposed around the neck of a bottle (or a preform) to be crystallized, for example, in such a manner as disclosed in Japanese Patent Publication No. Sho 62-25491.

The neck thus crystallized is easy to be deformed, for example, thermal distortion and heat shrinkage. There are thus raised many problems in that for obtaining high-quality products, an operator skilled in the art must set the injection molding conditions of preforms, control the quality of products (bottles or preforms) to be stored and design the necks under forecast of the shrinkage thereof. Therefore, small-scale manufacturers could not take this method. In this connection, the necks are required to have higher dimensional accuracy in many standards to prevent the leakage therethrough.

SUMMARY OF THE INVENTION

It is therefore an object of the present invention to provide a method and apparatus for molding a preform having a crystallized neck while maintaining the dimensional accuracy of the neck on injection molding.

Another object of the present invention is to provide a method and apparatus for molding a preform having its crystallized neck without useless prolongation of the injection molding time of the preform.

To this end, the present invention provides a method of forming a preform having a crystallized neck, the method comprising steps of:

injection molding a preform of thermoplastic resin having a neck by using at least an injection cavity mold, an injection core mold and a neck cavity mold;

releasing the preform from the injection cavity mold and the injection core mold while holding the neck of the preform by the neck cavity mold;

heating the neck within the neck cavity mold up to a temperature of crystallization of the thermoplastic resin; and releasing the neck from the neck cavity mold to remove the preform, and wherein the heating step includes a step of heating the neck cavity mold.

The present invention can effectively crystallize the neck of the preform while maintaining the dimensional accuracy of the injection molded neck since the crystallization is carried out using the neck cavity mold for injection molding. Further, the injection molding time will not uselessly be prolonged since the neck cavity mold is heated after the molded preform has been released from the injection core mold and injection cavity mold. In addition, the injection molding heat can be used directly to heat the neck up to the temperature of crystallization since the step of crystallizing the neck of the preform is carried out immediately after the preform has been injection molded. This is advantageous for heating the preform neck.

The heating step may include a step of heating the neck of the preform from the interior thereof. More particularly, a heating member can be inserted into the opening of the neck of the preform. Thus, the inner wall of the neck can efficiently be heated by the heating member.

The method of the present invention may further comprise steps of:

returning the neck cavity mold to the injection molding step after the removing step has been performed; and cooling the neck cavity mold before it is re-used for the injection molding step.

Thus, the injection molding step will not be performed while the neck cavity mold is in its high-temperature state. This can avoid any defective moldings having molding sinks and created foams in the neck. Since the neck cavity mold has been cooled when a preform is to be injection molded, time required to cool the molded preform within the injection molding mold can be reduced to less than the conventional cooling time in the injection molding step.

This cooling step may be carried out after the heating step and before the removing step. Particularly, the preform removing step can be carried out quickly only by opening the neck cavity mold. Therefore, a relatively sufficient time can be assured before the preform removing step. Such a sufficient time is preferably used for cooling the neck cavity mold.

Preferably, the cooling step includes a step of cooling the neck and neck cavity mold from the interior of the neck. As in the aforementioned heating step, a cooling member can be inserted into the opening of the neck of the preform in the cooling step. Thus, the neck and neck cavity mold can be efficiently cooled through the inner wall of the neck. As a result, the timing at which the preform having its crystallized neck is released from the neck cavity mold can be advanced. This can avoid any deformation of the neck after the releasing step.

The cooling step is preferably performed by contacting a cooling member with an inner wall of the neck of the preform. In such a case, the neck can be efficiently cooled by the cooling member. In addition, the deformation in the inner wall of the neck can be restrained by the cooling member while at the same time the deformation in the outer wall of the neck can be restrained by the neck cavity mold. Thus, the crystallized neck can have its more increased dimensional accuracy.

The thermoplastic resin used as injection molding a material of the preform may be polyethylene terephthalate resin. If the polyethylene terephthalate (PET) resin is used, a bottle blow molded from such a preform can have its stretched body to secure a given bottle quality while at the same time the non-stretched, blanched and crystallized neck can provide a desired heat resistance over the entire bottle.

In the heating step, it is preferred that the neck is heated up to the temperature of crystallization between 150° C. and 220° C. PET resin is crystallized at a temperature equal to or higher than 120° C., but more quickly crystallized at a temperature ranging between 150° C. and 220° C. This reduces the heating time to shorten the molding cycle time including the crystallizing step.

The neck may include a cap fitting part and a cap non-fitting part following the cap fitting part. In such a case, the neck cavity mold may define at least the outer wall of the cap fitting part. Thus, at least the cap fitting part of the neck will be crystallized. For example, if a plastic cap is to be mounted on the neck, it is sufficient to crystallize only the cap fitting part of the neck which is required to have a heat resistance when the bottle is filled with a content subjected to high-temperature sterilization. Alternatively, the neck cavity mold may define the outer wall of both the cap fitting and non-fitting parts of the neck. Thus, a thermal deformation in the neck can be prevented by crystallizing the entire non-stretched neck area. For example, when a metallic cap is to be fitted on the neck, it is desirable that the entire neck area is crystallized to avoid any deformation due to capping pressure. Furthermore, the lower non-orientated area of the neck may also be crystallized.

The neck cavity mold is preferably intermittently carried through each of the steps in a circulatory manner. This is because each of the steps can securely be carried out at the corresponding position at which the neck cavity mold stops.

The heating step may be divided into a plurality of sub-steps. In such a case, the neck cavity mold may intermittently be moved through the plurality of heating sub-steps. Since the step of heating the neck cavity mold which requires a relatively long time is divided into a plurality of steps, the productivity per unit time can be improved.

It is preferred that time required by each of the heating sub-steps does not exceed time required by the injection molding step. Thus, the neck may be crystallized without reducing a productivity of the preform.

The present invention further provides a preform molding apparatus comprising:

- a conveying path for circularly conveying a plurality of neck cavity molds;
- an injection molding station located in the middle of the conveying path for injection molding a preform of thermoplastic resin having a neck by using an injection cavity mold and an injection core mold in addition to the neck cavity molds;
- at least one heating station located in the middle of the conveying path for heating each of the neck cavity molds holding the neck of the preform to heat the neck within the neck cavity mold up to a temperature of crystallization of the thermoplastic resin; and
- a removing station for releasing the neck from the neck cavity mold to remove the preform out of the apparatus.

Such a preform molding apparatus can efficiently execute the aforementioned method of the present invention.

It is preferred that the number of heating stations is between 2 and 6. Time required to injection mold an all-purpose preform (except time required to close and open the mold) ranges between 10 seconds and 25 seconds and will hardly exceed 30 seconds. Time required to heat the neck cavity mold up to a temperature required by the crystallization is around 60 seconds and 180 seconds. Thus, a commercially optimum production efficiency can be provided by using 2 to 6 heating stations.

DETAILED DESCRIPTION OF THE PREFERRED EMBODIMENTS (First Embodiment)

Figure 1:
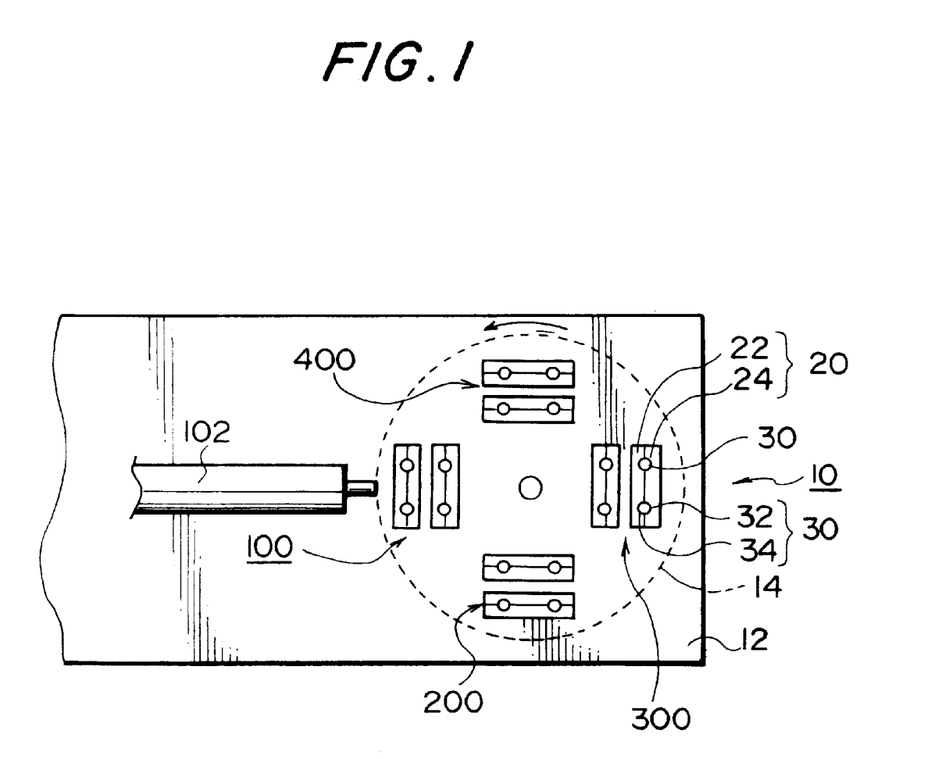
FIG. 1 is a schematic plan view of a preform injection molding apparatus related to an embodiment of the present invention.

Referring now to FIG. 1, a preform molding apparatus comprises a rotary disc 14 located above a machine base 12. The rotary disc 14 includes eight pairs of neck mold fixing plates 20, each two pairs among them being located parallel to each other and disposed on the disc at a position angularly spaced apart from the other adjacent position by 90 degrees.

Each of the neck mold fixing plate pairs 20 consists of two openable split plates 22, 24.

A plurality (e.g., two in FIG. 1) of neck cavity molds 30 are formed in each neck mold fixing plate pair 20. Each of the neck cavity molds 30 is formed by split mold parts 32 and 34. One of the split mold parts 32 is fixed to the split plate 22 while the other split mold part 34 is fixedly mounted on the split plate 24. Thus, the neck cavity molds 30 can be opened or closed when the split plates 22 and 24 are separated from or moved toward each other.

The neck mold fixing plate pairs 20 are intermittently moved in one direction as the rotary disc 14 is intermittently rotated through each 90 degrees. Such an arrangement is described in Japanese Patent No. 1735818 owned by the applicant, therefore, will not be further described herein.

As can be seen from FIG. 1, an injection molding station 100, first heating station 200, second heating station 300 and cooling/removing station 400 are disposed at the respective positions to which the rotary disc 14 is rotatably moved through 90 degrees.

(Injection Molding Station)

The injection molding station 100 includes an injection device 102 for injecting a thermoplastic resin (e.g., PET). The injection device 102 includes a nozzle connectable to a hot runner (not shown). The injection device 102 can inject a molten resin into an injection mold through such a hot runner nozzle 104 as shown in FIG. 2.

Figure 2:
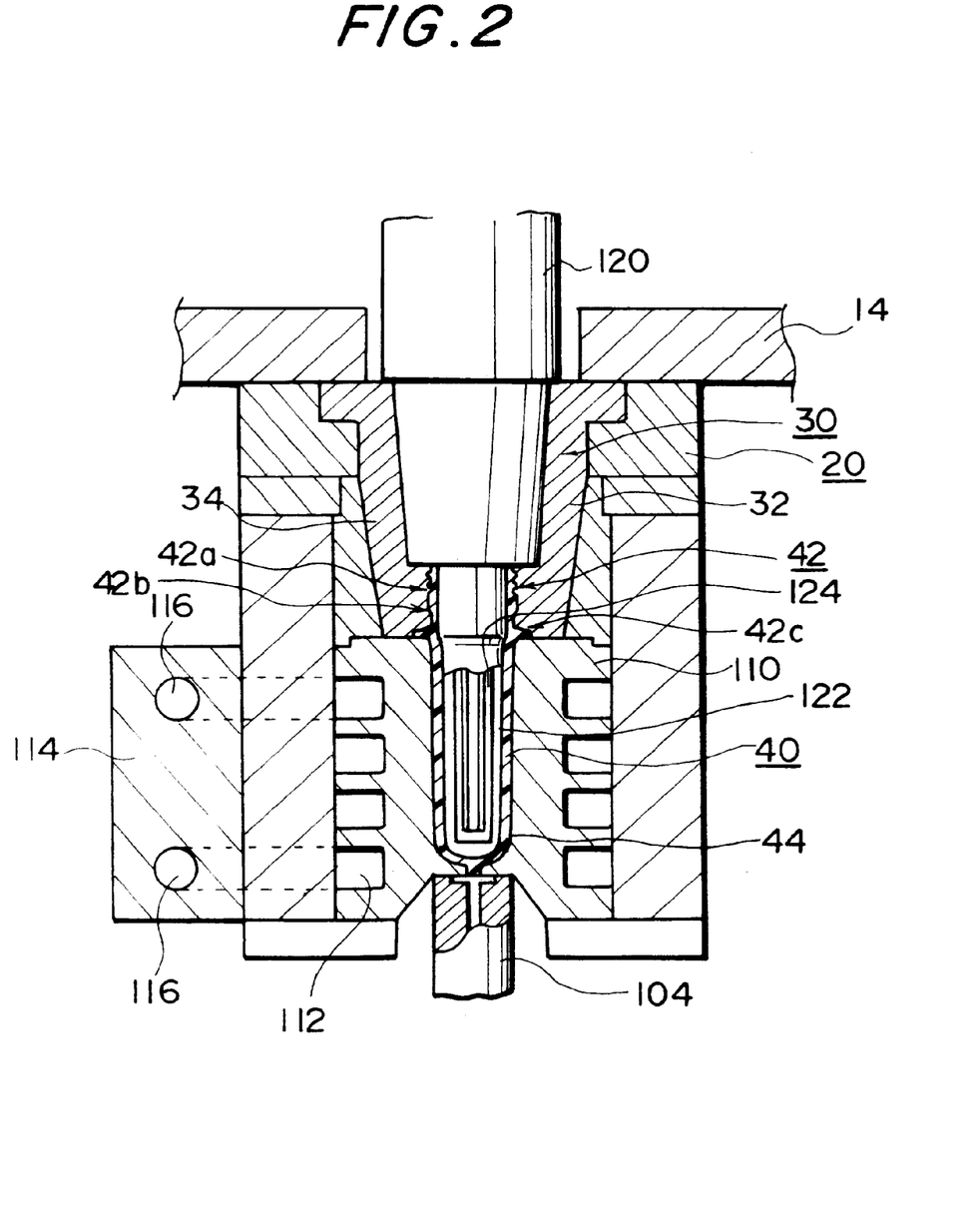
FIG. 2 is a schematic cross-section illustrating a preform injection molding step in a first embodiment of the present invention.

The injection mold generally comprises the aforementioned neck cavity molds 30, injection cavity molds 110 and injection core molds 120, as shown in FIG. 2.

Describing a preform 40 to be injection molded with reference to FIG. 2, it generally has a neck 42 located at an open end side of the preform 40 and a body 44 connecting the neck 42. The neck 42 may have a threaded part 42a, a locking ring 42b and a support ring 42c, for example. The area including the threaded part 42a and locking ring 42b forms a cap fitting area on which a plastic or metallic cap will be fit after a bottle blow molded from the preform 40 has been filled with a content. On the other hand, the support ring 42c forms a cap non-fitting area which will be used to support the bottle when it is in a content filling or capping step.

Each injection cavity mold 110 defines the outer wall of the body 44 of the preform 40. The injection cavity mold 110 is formed with a cooling channel 112 through which a coolant (e.g., cooling water) passes. The injection cavity mold 110 also includes a cooling water distributing plate 114 disposed therearound, which distributing plate 114 includes a cooling channel 116 communicating with the cooling channel 112 of the injection cavity mold 110.

Each injection core mold 120 has a core pin 122 for defining the inner wall of the preform 40. The core pin 122 also includes a cooling channel 124 through which the coolant or cooling water passes.

Each neck cavity mold 30 formed by the split mold parts 32 and 34 defines the outer wall in the neck 42 of the preform 40. In the present embodiment, the neck cavity mold 30 is adapted to define the outer wall of the neck 42 extending from the open top edge thereof to the top face of the support ring 42c. However, the neck cavity mold 30 may define the outer wall of the preform extending from the open top of the neck 42 to the portion of the body immediately below the support ring 42c. This area may be crystallized since it will not be orientated as the preform is blow molded into a bottle.

(First and Second Heating Stations)

The first and second heating stations 200, 300 are of the same structure. Therefore, only the first heating station 200 shown in FIG. 3 will now be described.

Figure 3:
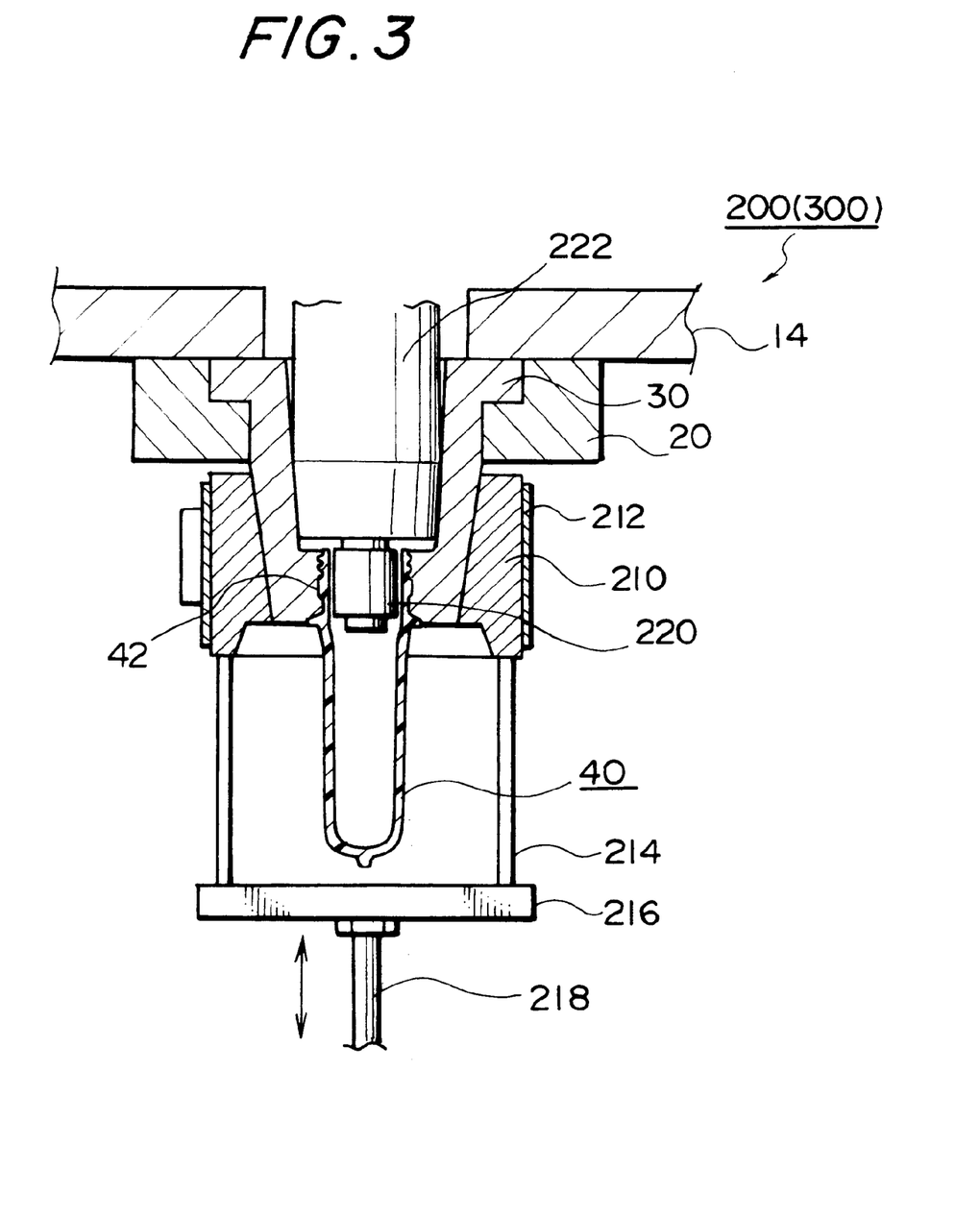
FIG. 3 is a schematic cross-section illustrating a heating step of a preform neck in the first embodiment of the present invention.

Referring to FIG. 3, the first heating station 200 comprises heating blocks 210 for heating the neck cavity molds 30 in contact with the outer wall thereof, and heating cores 220 for heating the neck 42 of a preform 40 from the interior thereof and is inserted into the neck 42 of the preform 40. Each of the heating blocks 210 is wound by a heating source such as a band heater 212. The heating block 210 is connected to an elevator plate 216 through a support member 214. As the elevator plate 216 is moved upward and downward by a cylinder rod 218, the heating block 210 will be moved between a position in which it is in intimate contact with the outer wall of the neck cavity mold 30 and another position in which the heating block 210 is retracted from the circulatory conveying path of a preform without interference.

On the other hand, each of the heating cores 220 is fixedly mounted on the tip of a heating core rod 222 which is movable through the rotary disc 14 in a direction from the top to bottom of the disc. When each neck cavity mold 30 holding a preform 40 is moved into and stopped at the first heating station 200, each heating core rod 222 is downwardly driven to locate the heating core 220 within the neck 42 of the preform 40.

(Cooling/Removing Station)

Figure 4:
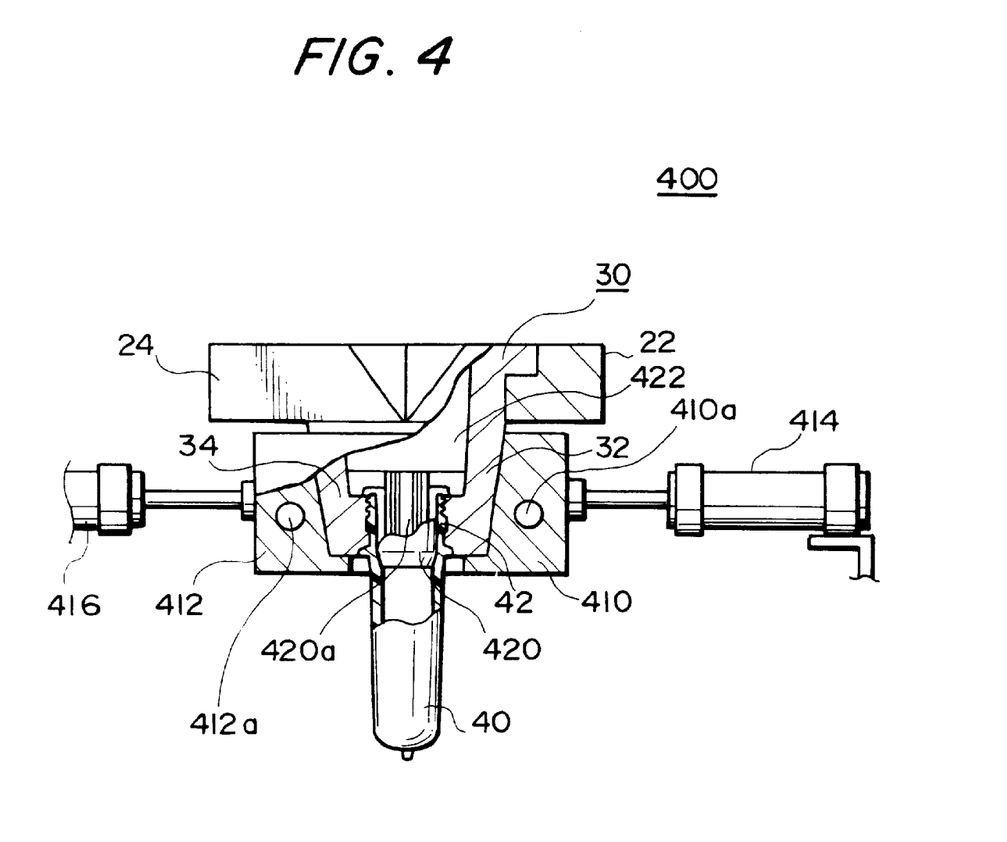
FIG. 4 is a schematic cross-section illustrating a cooling step of a neck cavity mold in the first embodiment of the present invention.

As shown in FIG. 4, the cooling/removing station 400 comprises first and second cooling blocks 410, 412 for cooling the neck cavity molds 30 in contact with the outer walls thereof, and cooling cores 40 each for cooling the neck 42 of the preform 40 from the interior thereof when the cooling core 40 is disposed in the neck 42. The first cooling block 410 has a cooling channel 410a through which the coolant (e.g., cooling water) passes. The first cooling block 410 can be driven by a first drive cylinder 414 to move into contact with one split mold part pairs 32 forming the neck cavity molds 30. The second cooling block 412 has a cooling channel 412a through which the coolant (e.g., cooling water) passes. The second cooling block 412 can be driven by a second drive cylinder 416 to move into contact with the other split mold part pairs 34 for forming the neck cavity molds 30.

Each of the cooling cores 420 has a cooling channel 420a through which the coolant (e.g., cooling water) passes and is fixedly mounted on the tip of a cooling core rod 422 which is movable through the rotary disc 14 in a direction from the top to bottom. As the preforms 40 are carried to the cooling/removing station 400 while the necks 42 are being held by the neck cavity molds 30, the cooling core rods 422 are downwardly moved to locate the cooling cores 420 into the necks 42 of the preforms 40. At this time, each cooling core 420 is brought into intimate contact with the inner wall and an open end portion of the neck 42.

Figure 5:
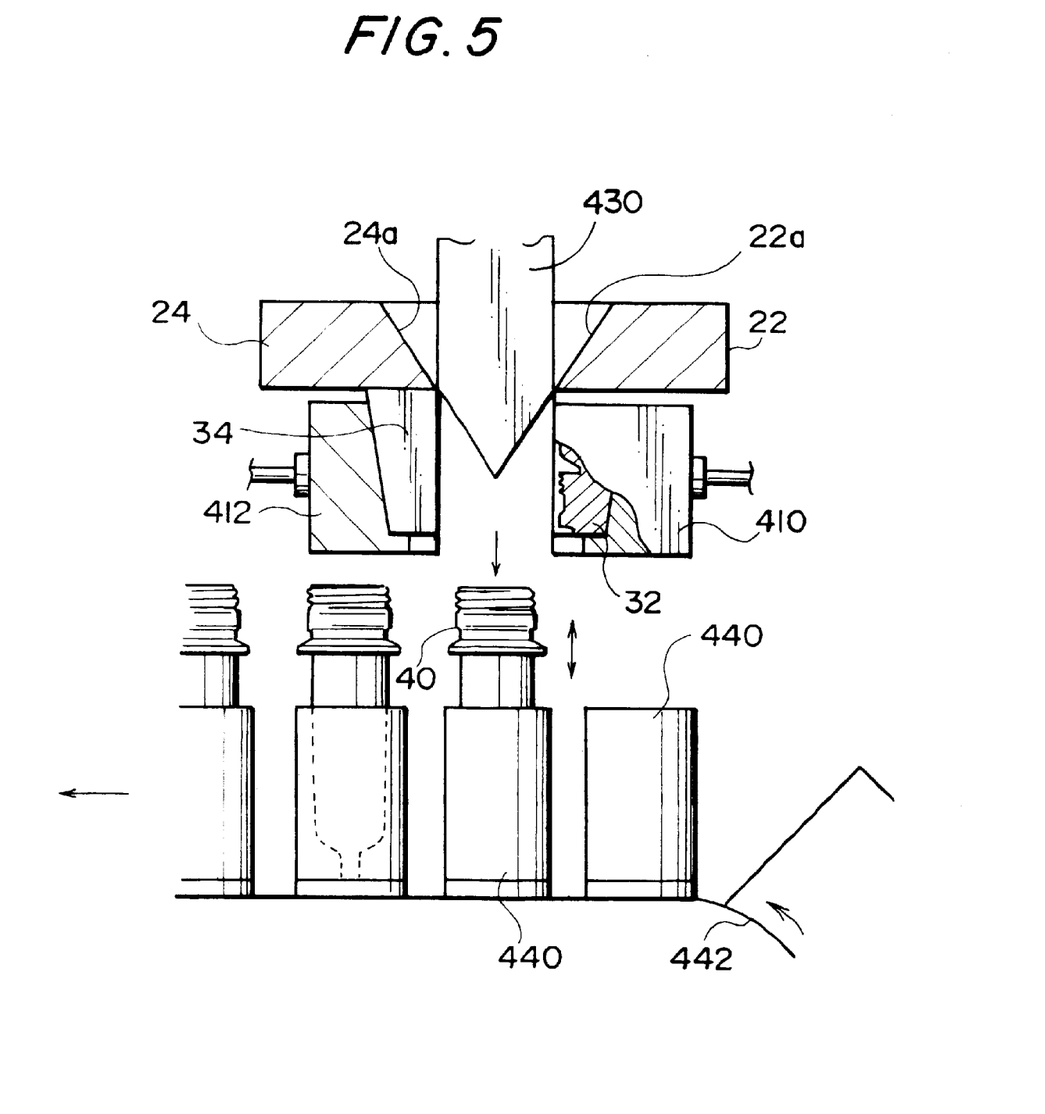
FIG. 5 is a schematic cross-section illustrating a removing step of a preform in the first embodiment of the present invention.

The cooling/removing station 400 also includes a mold opening cam 430 as shown in FIG. 5, for opening a pair of neck mold fixing plate 20 formed by two split plates 22 and 24. For such a purpose, each of the split plates 22 and 24 is formed with a cam follower face 22a or 24a, as shown in FIG. 5. The mold opening cam 430 can downwardly be moved to spread the cam follower faces 22a and 24a out so that the split plates 22 and 24 will be opened and separated from each other. Thus, the preforms 40 fall when the split mold parts 32 and 34 forming the neck cavity molds 30 are opened, as shown in FIG. 5.

The present embodiment provides conveying-out pots 440 for receiving the fallen preforms 40. As shown in FIG. 5, the conveying-out pots 440 may be fixedly mounted and arranged on a conveyor belt 442 with a given pitch. As the conveyor belt 422 is moved, these conveying-out pots 422 are also intermittently carried out of the molding machine.

A preform molding process in the preform molding apparatus 10 will now be described.

(Injection Molding Step)

The injection molding step is carried out by clamping the neck cavity molds 30, injection cavity molds 110 and injection core molds 120 to charge PET resin from the injection device 102 through the hot runner nozzle 104, as shown in FIG. 2. At this time, the injection cavity molds 110 and injection core molds 120 have been cooled by the coolant flowing the cooling channels 112 and 124 formed therein. Thus, the charged molten resin is cooled to form preforms 40 conforming to the configuration of the cavities. On completion of the injecting time and cooling time, the injection core molds 120 are moved upwardly relative to the neck cavity molds 30 while at the same time the injection cavity molds 110 are moved in the downward direction. Thus, the preforms 40 with their necks 42 held by the neck cavity molds 30 can be released from the injection cavity mold 110 and injection core mold 120.

In the injection molding step, two pairs of neck cavity molds 30 shown in FIG. 1 are used to injection mold four preforms 40 simultaneously. Thereafter, the rotary disc 14 is angularly rotated by 90 degrees to carry the preforms 40 to the first heating station 200 while the necks thereof being held by the neck cavity molds 30.

In the injection molding step, it is not necessary to cool the preforms within the molds until they have completely been cooled. In viewpoint of the productivity, it is preferable that the mold opening is performed at such a time point that the preforms have been cooled sufficiently to remove them from the injection core molds. The wall-thickness of the body of the all-purpose preform is between 2.5 mm and 5.0 mm. Time required to inject and cool the preform in the injection molding step is around 10 to 25 seconds.

(First Heating Step)

As the preforms 40 arrive at the first heating station 200 while being held by the neck cavity molds 30, the heating blocks 210 are upwardly moved and the heating cores 222 are downwardly moved. Thus, such a state as shown in FIG. 3 is set. Since each of the heating blocks 210 has the band heater 212, the neck cavity mold 30 intimately contacting that heating block 210 will be heated. Therefore, the neck 42 of the preform 40 will be heated from the side of its outer wall through a solid heat conduction with the neck cavity mold 30. On the other hand, each of the heating cores 222 is inserted into the interior of the neck 42 of the preform 40. The heating core 222 will radiation heat the neck 42 from the side of its inner wall. By heating the neck 42 from both the inside and outside, the neck 42 can be heated up to a temperature of crystallization fitting the injection molding resin material used. In the present embodiment, the neck 42 is heated up to a temperature equal to or higher than 120° C. since the preform 40 is molded of PET resin. With the PET resin, a peak temperature most promoting the crystallization is equal to about 180° C. depending on the grade thereof. Preferably, the temperature of crystallization in the PET resin is generally between 150° C. and 220° C.

Thus, the necks 42 of the preforms 40 initiate to be blanched and crystallized by locally heating them.

FIG. 3 shows the radiation heating of the neck 42 when the heating core 220 is not in contact with the neck 42. However, an alternate heating core 220 having its easy-release surface as treated by TEFLON®, a registered trademark of E.I. du Pont de Nemours & Co., Inc. of Wilmington, Del., for a fluorocarbon or fluoropolymer coating may bring into contact with the inner wall of the neck 42 to heat it through the solid heat conduction. This can prevent any thermal deformation in the neck 42.

(Second Heating Step)

In the present embodiment, the heating process requiring the maximum time is divided into a plurality of heating steps (e.g., two steps) to reduce the production cycle time for preforms 40. For such a purpose, the rotary disc 14 is further intermittently rotated by 90 degrees after the heating blocks 210 and heating cores 220 have been moved relative to the neck cavity molds 30 respectively in the downward and upward directions. Thus, the preforms 40 will be moved into the second heating station 300 while being held by the neck cavity molds 30 at the necks 42 thereof.

In the second heating station 300, the necks 42 of the preforms 40 are heated up to the temperature of crystallization as in the first heating station 200 shown in FIG. 3. The crystallization proceeds while the necks are in a temperature equal to or higher than the temperature of crystallization and even after the external heating has been stopped, for example, when the heating blocks 210 were moved in the downward direction. To assist the cooling time in the subsequent step, therefore, the heating step in the second heating station 300 may be stopped at any suitable time to lower the temperature in the necks. After a given heating time has elapsed in the second heating station 300, the heating blocks 210 and heating cores 220 are separated from the necks 42 of the preforms 40, as in the first heating station 200. Subsequently, the rotary disc 14 is further intermittently rotated by 90 degrees. Thus, the preforms 40 will be conveyed to the cooling/removing station 400 as the final step while being held by the neck cavity molds 30 at their necks 42 thereof.

The total heating time in the first and second heating stations depends on the wall-thickness in the neck, the material and size of the neck cavity mold and the necessary heat resistance as well as the degree of crystallization of a product. Time required to form an all-purpose bottle is around 60 to 180 seconds.

(Cooling/Removing Station)

As the neck cavity molds 30 holding the preforms 40 arrive at the cooling/removing station 400, the first and second drive cylinders 414, 416 are driven to bring the first and second cooling blocks 410, 412 into intimate contact with two split mold parts 32, 34 forming each of the neck cavity molds 30. The neck cavity molds 30 will be cooled by the cooling water circulating in the cooling channels 410a and 412a of the first and second cooling blocks 410, 412. Thus, the neck cavity molds 30 heated in the first and second heating stations 200, 300 will be cooled at this station 400. In such a manner, the neck cavity molds 30 will be pre-cooled before they are returned to the injection molding station 100 for injection molding new preforms 40.

The neck 42 of each of the preforms 40 is cooled from its interior by means of the cooling core 420 inserted into the neck 42. The cooling core 420 is brought into intimate contact with the inner wall of the neck 42 to efficiently cool it while cooling the corresponding neck cavity mold 30 through the neck 42. Consequently, any deformation can be prevented in the neck 42 after the preform 40 has been removed out of the neck cavity mold 30.

Since the inner wall of the neck 42 intimately contacts the cooling core 420 and the outer wall thereof intimately contacts the neck cavity mold 30, the neck 42 can be re-shaped on cooling.

After the preform necks 42 and neck cavity molds 30 have been cooled for a given cooling time, the mold opening cam 430 is downwardly moved as shown in FIG. 5. Thus, the split plates 22 and 24 of a pair of the neck mold fixing plates 20 retaining the neck cavity molds 30 are separated from each other. As a result, the split mold parts 32 and 34 fixed to the respective split plates 22 and 24 are separated from each other. Therefore, the preforms 40 are free and fall downward.

The fallen preforms 40 are respectively received by the conveying-out pots 440 that have been placed at their stand-by positions immediately below the fallen preforms 40. The preforms 40 are held within the respective conveying-out pots 440 under their upright state. Thus, the neck 42 retaining its crystallizing heat can be prevented from contacting any other part. This can avoid any deformation in the neck 42.

The conveying-out pots 440 into which the preforms 40 have been inserted are intermittently transferred to any suitable location outside the preform injection molding apparatus 10 by means of the belt conveyor 442.

In the present embodiment, the first and second cooling blocks 410, 412 are maintained in intimate contact with the split mold parts 32 and 34 when they are separated from each other, as shown in FIG. 5. Such an intimate contact is continued even after the split mold parts 32 and 34 have been closed toward each other with the corresponding preform 40 having fallen. In other words, the first and second cooling blocks 410, 412 can continuously cool the neck cavity molds 30 immediately before they are moved from the cooling/removing station 400 into the injection molding station 100. Thus, the necks 30 can be cooled sufficiently to be ready for the subsequent injection molding process before the neck cavity molds 30 are returned to the injection molding station 100.

(Second Embodiment)

A second embodiment of the present invention will now be described. The entire arrangement of the second embodiment is similar to that of the first embodiment shown in FIG. 1. First and second heating stations and cooling/removing station which are different from those of the first embodiment will only be described with reference to FIGS. 6 to 9.

(Injection Molding Station and Injection Molding Step)

Figure 6:
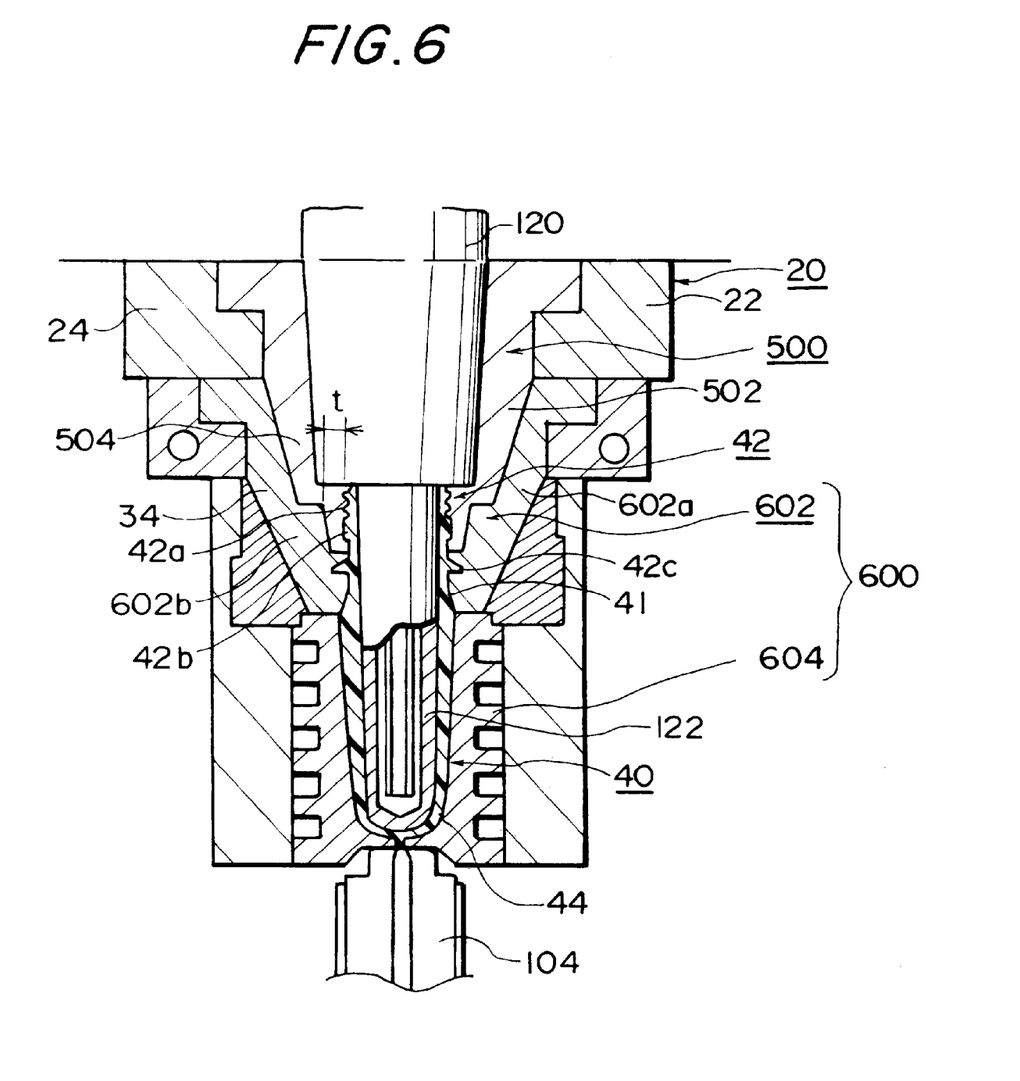
FIG. 6 is a schematic cross-section illustrating a injection molding step of a preform in a second embodiment of the present invention.

A neck cavity mold 500 used in the second embodiment comprises split mold parts 502 and 504 that are similar to those of the first embodiment, as shown in FIG. 6. However, the neck cavity mold 500 is different from the first embodiment in that it defines different neck area. The neck cavity mold 500 defines the outer wall of the neck 42 of the preform 40 only at its threaded part 42a and its locking ring 42b, rather than extending to the area of the support ring 42c.

Reduction of area to be defined by the neck cavity mold 500 is because the heating efficiency can be improved by reducing the wall-thickness of the neck cavity mold 500 smaller than that of the first embodiment and because the heat resistance in the support ring 42c is not necessarily required when the plastic cap is mounted on the bottle.

As shown in FIG. 6, the second embodiment comprises an injection cavity mold 600 which is divided into first and second injection cavity molds 602, 604. The first injection cavity mold part 602 has horizontally openable split mold parts 602a and 602b. The first injection cavity mold part 602 defines the support ring 42c in the preform neck 42 which will not be defined by the neck cavity mold 500. The preform 40 used in the second embodiment may have an undercut-shape shoulder 41 below the support ring 42c, as shown in FIG. 6. The first injection cavity mold 602 also defines the outer wall of the undercut-shape shoulder 41.

The second injection cavity mold 604 defines the outer wall of the body 44 located below the shoulder 41. The first and second injection cavity molds 602, 604 include, for example, cooling channels.

In the second embodiment, similarly, a preform 40 can be injection molded by charging PET resin after the neck cavity mold 500, first and second injection cavity molds 602, 604 and injection core mold 120 have been clamped as shown in FIG. 6. After the passage of a given injection and cooling time, the mold will be opened and the neck cavity mold 500 will carry the molded preform 40 into the first heating station 200.

When the second injection cavity mold 604 is moved downwardly relative to the neck cavity mold 500 to open the mold, the split mold parts 602a and 602b forming the first injection cavity mold 602 are first separated from each other in the horizontal direction at the initial mold opening step. Such a drive can be accomplished by using any taper pin means. After the split mold parts 602a and 602b have cleared the maximum diameter portions of the support ring 42c or body 44 of the preform 40, the second injection cavity mold 604 is moved downwardly relative to the neck cavity mold 500 together with the first injection cavity mold 602. To clamp the mold, a reversal procedure will be performed.

(First and Second Heating Stations)

Figure 7:
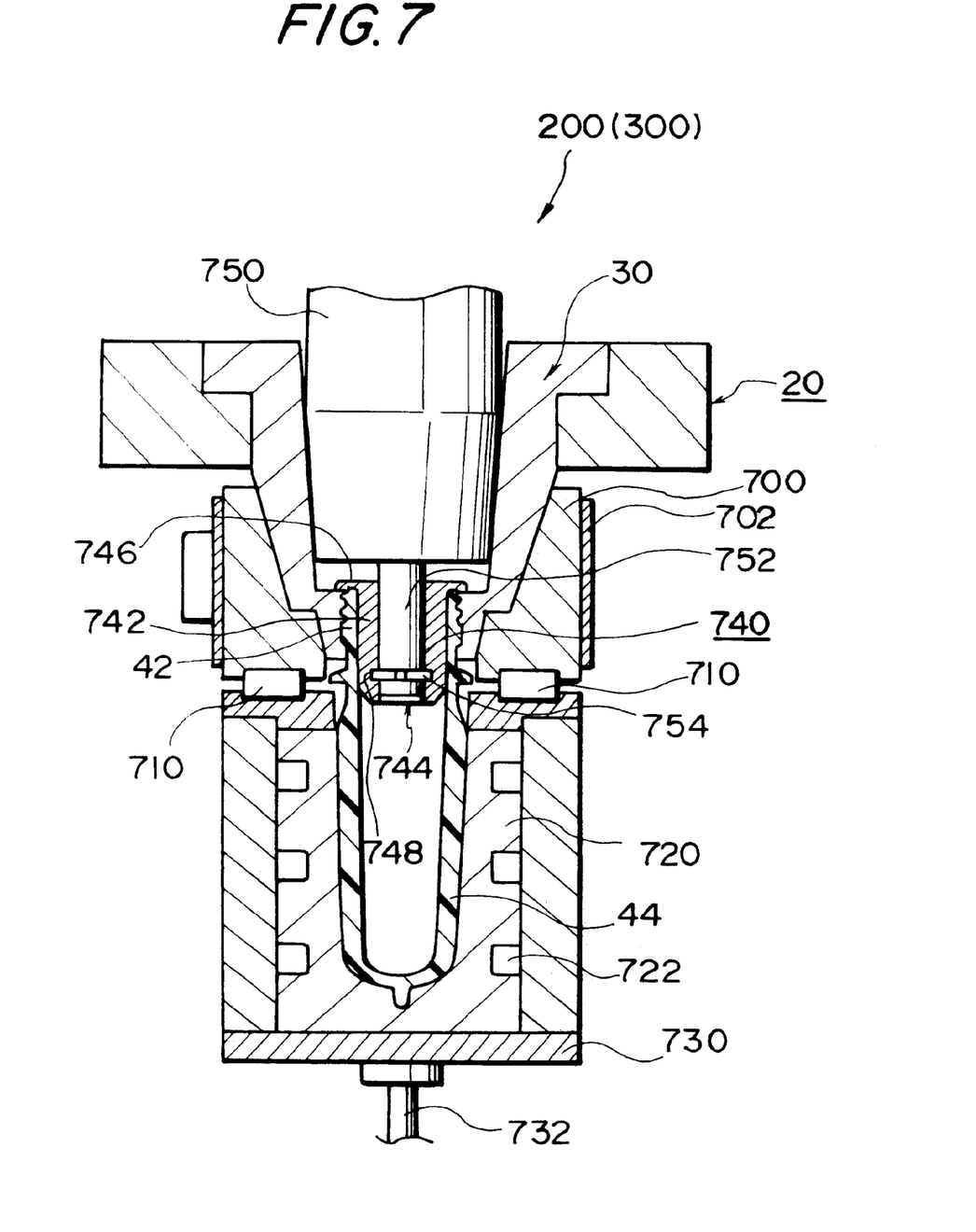
FIG. 7 is a schematic cross-section illustrating a heating step of a preform neck in the second embodiment of the present invention.

The heating process in the second embodiment is shown in FIG. 7. In the first and second heating stations 200, 300 shown in FIG. 1, the second embodiment uses a heating block 700 and a heating/cooling piece 740 to heat the neck 42 and a cooling pot 720 to cool the body 44. If it is required that the cooling pot is more efficiently used for cooling, a compressed air may be conducted into the interior of the preform to bring the outer wall of the body 44 into intimate contact with the inner wall of the cooling pot.

The heating block 700 is wound by a band heater 702 and connected to the cooling pot 720 through heat insulation connecting materials 710. The cooling pot 720 has a cavity surface contacting the outer wall of the body 44 of the preform 40 and also is formed with a cooling channel used to cool the cavity surface. The cooling pot 720 is fixedly mounted on an elevator plate 730 and moves upward and downward together with the heating block 700 when a cylinder rod 732 is driven.

On the other hand, the heating/cooling piece 740 inserted into the interior of the preform neck 42 is used for both a heating piece and cooling piece such that functions as a heating piece in the first and second heating stations 200, 300 shown in FIG. 1 and as a cooling piece in the cooling/removing station 400. The heating/cooling piece 740 has a top defining flange 746 on the top end of a sleeve 742 having a hollow portion 744 for defining the top of the preform neck 42. The hollow portion 744 of the sleeve 742 is formed, in its middle, with an engaged groove 748 which is engaged by an engagement member 754.

(First Heating Step)

The heating process of the second embodiment is same as that of the first embodiment in that a core block body 750 having a heating rod 752 is inserted into the interior of the neck cavity mold 500 in the first and second heating stations 200, 300 shown in FIG. 1.

In the first heating station 200, the core block body 750 is downwardly moved to insert the heating/cooling piece 740 into the preform neck 42. More particularly, the heating/cooling piece 740 is held by the heating rod 752 through the engagement member 754 at the tip of the core block body 750. When the heating block body 750 is downwardly moved, therefore, the heating/cooling piece 740 is also downwardly moved together to insert the heating/cooling piece 740 into the preform neck 42. In the first heating station 200, the heating/cooling piece 740 is heated through the heating rod 752 so that the threaded part 72a and locking ring 42b of the preform neck 42 will be heated.

The heating of the neck cavity mold 500 through the heating block 700 is same as that of the first embodiment. Thus, the threaded part 42a and locking ring 42b of the neck 42 are heated from both the inside and outside to set the temperature of crystallization.

During the heating process shown in FIG. 7, the body 44 of the preform 40 is cooled by the cooling pot 720. Therefore, the necessary injection molding time can be reduced to prevent the body 44 retaining the heat from being thermally deformed. At the same time, the wall-thickened body 44 can be prevented from being blanched and crystallized due to insufficient cooling.

As the heating process in the first heating station 200 terminates, the core block body 750 is moved upwardly relative to the neck cavity mold 500. At this time, the heating/cooling piece 740 is retained within the preform neck 42. For such a purpose, the heating rod 752 has a drive mechanism for reducing the diameter of the engagement member 754 in the radial and inner direction. Thus, as the core block body 750 is upwardly moved, the engagement member 754 is also upwardly moved together with the heating rod 752 and separated from the interior of the heating/cooling piece 740.

Figure 8:
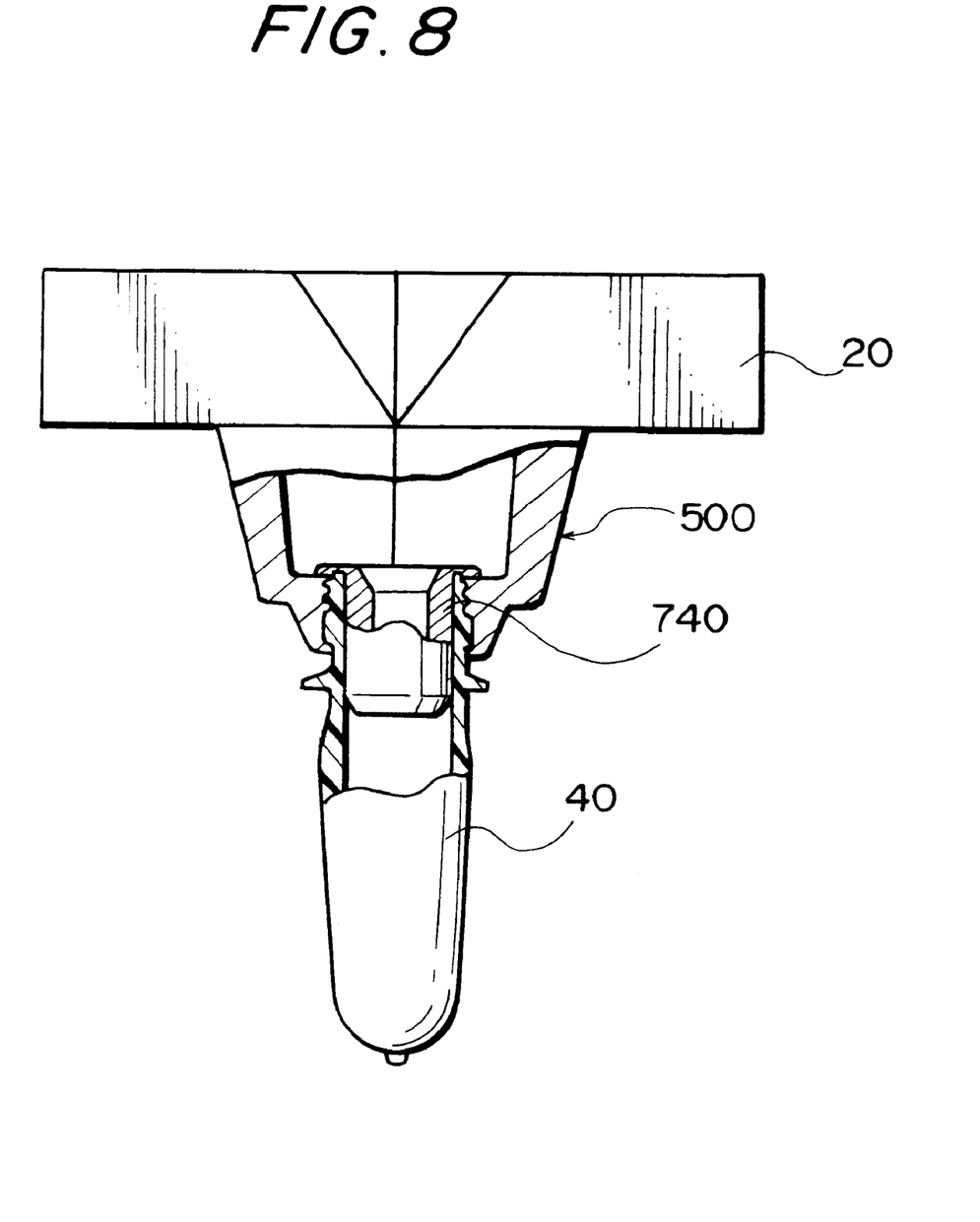
FIG. 8 is a schematic cross-section illustrating the conveyance of preform through a first and a second heating stations and a cooling/removing station in the second embodiment of the present invention.

FIG. 8 shows the conveyance of the preform 40 through the neck cavity mold 500 from the first heating station 200 toward the second heating station 300. As shown in FIG. 8, the preform neck 42 held by the neck cavity mold 500 maintains the heating/cooling piece 740 therein. Thus, the heat retained in the heating/cooling piece 740 can heat the threaded part 42*a* and locking ring 42*b* in the neck 42 while restraining their thermal deformation.

(Second Heating Step)

The heating process in the second heating station 300 will be described. In the second heating station, the core block body 750 is downwardly moved to insert the heating rod 752 into the hollow portion 744 of the heating/cooling piece 740 in intimate contact with the inner wall thereof, as in the first heating station 200. In the second heating station 300, however, the engagement member 754 is not necessarily required. In the second heating station 300, the neck 42 is heated, from the outside by the heating block 700 through the neck cavity mold 500 and from the inside by the heating/cooling piece 740, as in FIG. 7. Further, the body 44 of the preform 40 is cooled by the cooling pot 720.

On termination of the heating process in the second heating station 300, the core block body 750 is upwardly moved to separate the heating rod 752 from the heating/cooling piece 740. Therefore, the heating/cooling piece 740 is retained within the preform neck 42 even after the heating process has terminated in the second heating station 300.

Consequently, the preform 40 can be conveyed from the second heating station 300 toward the cooling/removing station 400 in the same manner as in FIG. 8.

(Cooling/Removing Step)

Figure 9:
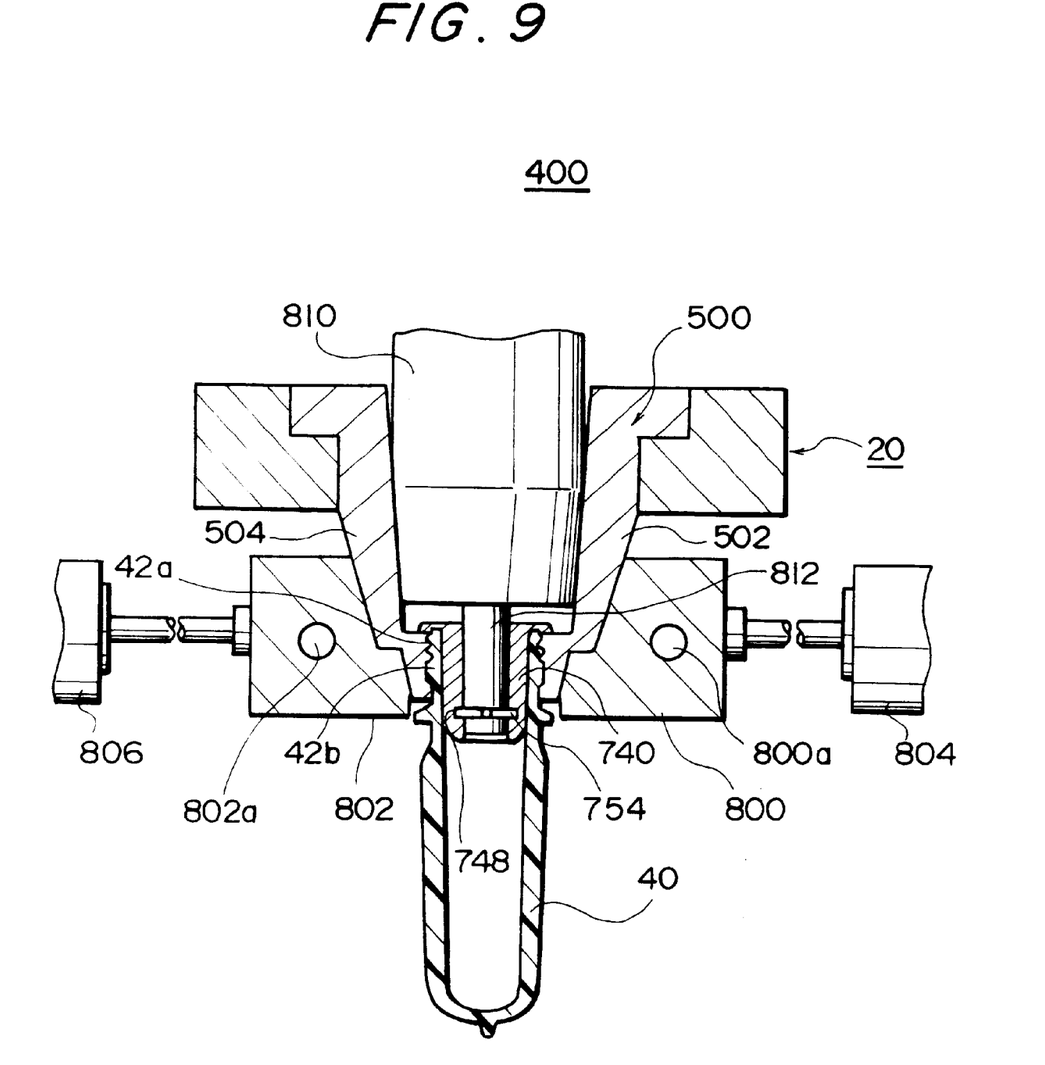
FIG. 9 is a schematic cross-section illustrating a cooling step of a neck cavity mold in the second embodiment of the present invention.

In the cooling/removing station 400, the neck cavity mold 500 is cooled from the outside in the same manner as in the first embodiment of FIG. 4. More particularly, as shown in FIG. 9, first and second cooling blocks 800, 802 respectively having cooling channels 800*a* and 802*a* are inwardly driven into intimate contact with the split mold parts 502 and 504 of the neck cavity mold 500 under actuation of first and second drive cylinders 804, 806.

The inside cooling of the neck cavity mold 500 can be accomplished by downwardly moving a core block body 810 to insert a cooling rod 812 on the tip thereof into the hollow portion 744 of the heating/cooling piece 740 and to bring the cooling rod 812 into intimate contact with the inner wall of the hollow portion 744. At this time, the engagement member 754 is disposed on the cooling rod 812 and its outer diameter is spread out to connect with the heating/cooling piece 740 at a position opposite to the engaged groove 748. The heating/cooling piece 740 can be cooled through the cooling rod 812 to cool the threaded part 42*a* and locking ring 42*b* in the neck 42 of the preform 40.

In the cooling process, the outer wall of the neck 42 of the preform 40 defined by the neck cavity mold 500 while the inner and top wall thereof is defined by the heating/cooling piece 740. Therefore, these areas can be re-shaped while being cooled and fixed.

When the cooling process terminates, the core block body 750 is upwardly moved. Since the cooling rod 812 is connected to the heating/cooling piece 740 through the engagement member 754, the heating/cooling piece 740 will be separated out of the neck 42.

The heating/cooling piece 740 separated out of the neck 42 is returned to the first heating station 200 through a conveying path (not shown). Thus, the first heating station 200 can re-use the heating/cooling piece 740 to heat the next preform 40. When the heating/cooling piece 740 is being returned to the firs heating station 200, it is preferable to pre-heat the heating/cooling piece 740.

After the heating/cooling piece 740 has been separated from the neck 42, the mold opening cam 430 is downwardly moved to remove the preform 40 from the neck cavity mold 500, as in the removing step of the first embodiment shown in FIG. 5.

The present invention is not limited to the aforementioned embodiments, but may be carried out in any of various other forms without departing from the scope of the invention. For example, the preforms 40 may be conveyed through a linear conveying means as shown in FIG. 10, rather than the rotary conveying means shown in FIG. 1.

Figure 10:
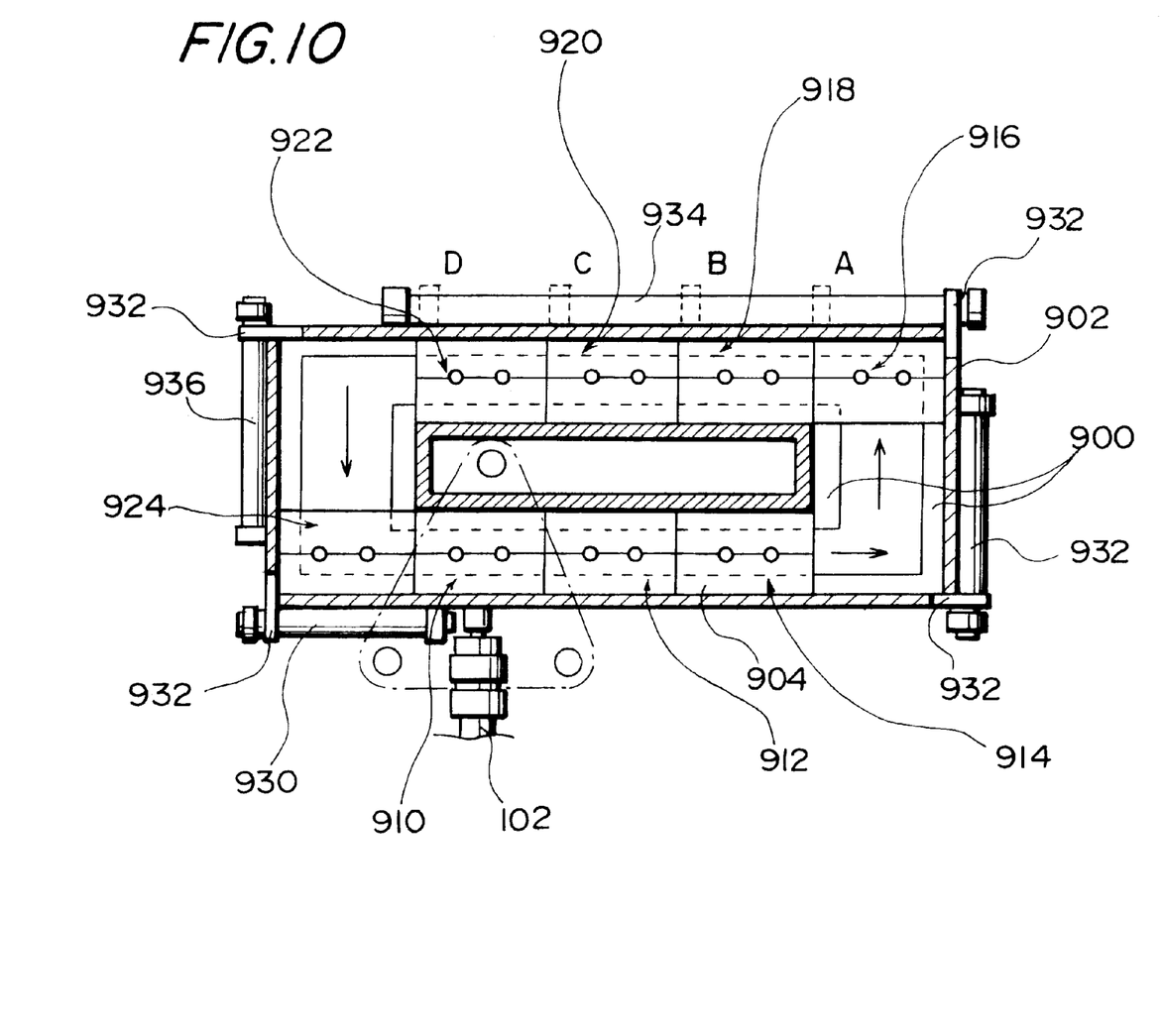
FIG. 10 is a schematic plan view illustrating a linear conveying type molding apparatus of the present invention in which the number of heating steps can be varied.

FIG. 10 shows an arrangement in which guide rails 900 are fixedly located on a support base 902 to extend along a rectangular conveying path. A plurality of neck cavity mold fixing plates 904 are intermittently conveyed in a circulatory manner or the guide rails 900. An injection molding station 910, first to sixth heating stations 912 to 922 and removing/cooling station 924 are disposed at positions in which the neck cavity mold fixing plates 904 stops. To carry the neck cavity mold fixing plates 904, first to fourth rodless cylinders 930 to 936 used as neck cavity mold fixing plate moving means are disposed around the rectangular conveying path at the respective sides. The first to fourth rodless cylinders 930 to 936 are actuated to move movement members 932 which in turn urge and convey the respective neck cavity mold fixing plates 904.

FIG. 10 shows six heating stations. In this case, the third rodless cylinder 934 moves a movement member 932 to a position shown by A in FIG. 10. Thus, the neck cavity mold fixing plates 904 will sequentially stop at all the third to sixth heating stations 916 to 922.

Depending on the type of preform to be molded, the number of heating stations may be changed within the range between 2 and 6 by eliminating any one of the third to sixth heating stations 916 to 922. Alternatively, any particular heating station may be disabled without eliminating any heating station. At this time, the number of neck cavity mold fixing plates 904 as well as the stroke of movement in the third rodless cylinder 934 may be changed depending on the number of heating stations to be actuated.

For example, if four heating stations are required for molding, two neck cavity mold fixing plates 904 may be eliminated under such a state as shown in FIG. 10. The stroke of movement in the third rodless cylinder 934 may further be changed to stop the movement members 932 at a position as shown by B in FIG. 10. Thus, the neck cavity mold fixing plates 904 can rapidly be moved from the second heating station 914 to the fifth heating station 920 skipping the third and fourth heating stations 916, 918. Similarly, the number of heating stations may selectively be set to any of 2 to 6 depending on time required to injection mold a preform as well as time required to crystallize the preform.

Any non-stretched area below the support ring 42*c* may be crystallized by the neck cavity molds 30 and 500, other than such areas as shown in FIG. 2 or 6. Since the non-stretched area from the blow molding step is of less heat resistance and mechanical strength, a desired heat resistance can be ensured by extending the neck cavity molds 30 and 500 in the downward direction to crystallize the non-stretched area. Although the neck cavity molds have been described to be of split type, they may be of any other type.

What is claimed is:

1. A method of forming a preform having a crystallized neck, said method comprising steps of:

injection molding a preform of thermoplastic resin having a neck by using at least an injection cavity mold, an injection core mold and a neck cavity mold;

releasing said preform from said injection cavity mold and said injection core mold while holding the neck of said preform by said neck cavity mold;

heating said neck within said neck cavity mold up to a temperature of crystallization of said thermoplastic resin; and releasing said neck from said neck cavity mold to remove said preform, and wherein said heating step includes a step of heating said neck cavity mold.

2. The method according to claim 1 wherein said heating step includes a step of heating said neck of said preform from the interior thereof.

3. The method according to claim 1, further comprising the steps of:

returning said neck cavity mold to said injection molding step after said removing step has been performed; and cooling said neck cavity mold before it is re-used for said injection molding step and after the neck releasing step.

4. The method according to claim 3 wherein said cooling step is carried out after said heating step and before said removing step.

5. The method according to claim 3 wherein said cooling step includes a step of cooling said neck and said neck cavity mold from the interior of said neck.

6. The method according to claim 5 wherein said cooling step is performed by contacting a cooling member with an inner wall of said neck of said preform.

7. The method according to claim 1 wherein said thermoplastic resin is polyethylene terephthalate resin.

8. The method according to claim 7 wherein said heating step heats said neck up to the temperature of crystallization between 150° C. and 220° C.

9. The method according to claim 1 wherein said neck includes a cap fitting part and a cap non-fitting part following said cap fitting part and wherein said neck cavity mold defines at least the outer wall of said cap fitting part and crystallizes at least said cap fitting part of said neck.

10. The method according to claim 1 wherein said neck includes a cap fitting part and a cap non-fitting part following said cap fitting part and wherein said neck cavity mold defines an outer wall of said cap fitting part and said cap non-fitting part and crystallizes an entire portion of said neck.

11. The method according to claim 1 wherein the neck cavity mold is intermittently carried through each of said steps in a circulatory manner.

12. The method according to claim 11 wherein said heating step is divided into a plurality of sub-steps and wherein said neck cavity mold is intermittently moved through said plurality of heating sub-steps.

13. The method according to claim 12 wherein time required by each of said heating sub-steps does not exceed time required by said injection molding step.

14. A preform molding apparatus comprising:

a conveying path for circularly conveying a plurality of neck cavity molds;

an injection molding station located in the middle of said conveying path for injection molding a preform of thermoplastic resin having a neck by using an injection cavity mold and an injection core mold in addition to said neck cavity molds;

at least one heating station located in the middle of said conveying path for heating each of said neck cavity molds holding said neck of said preform to heat said neck within said neck cavity mold up to a temperature of crystallization of said thermoplastic resin; and a removing station for releasing said neck from said neck cavity mold to remove said preform out of the apparatus.

15. The preform molding apparatus according to claim 14 wherein said removing station includes a cooling device for cooling said neck cavity mold.

16. The preform molding apparatus according to claim 14 wherein a plurality of said heating stations are located along said conveying path and wherein said neck cavity mold stops at each of said heating stations.

17. A preform molding apparatus comprising:

a conveying path for circularly conveying a plurality of neck cavity molds;

an injection molding station located in the middle of said conveying path for injection molding a preform of thermoplastic resin having a neck by using an injection cavity mold and an injection core mold in addition to said neck cavity molds;

at least one heating station located in the middle of said conveying path for heating each of said neck cavity molds holding said neck of said preform to heat said neck within said neck cavity mold up to a temperature of crystallization of said thermoplastic resin; and a removing station for releasing said neck from said neck cavity mold to remove said preform out of the apparatus, and wherein the number of said heating stations is between 2 and 6.

18. The method according to claim 1 wherein in said step of heating the neck, the neck is heated to the crystallization temperature from its outer surface for crystallizing the neck.

19. The preform molding apparatus according to claim 14 wherein the at least one heating station includes means for heating the neck mold to heat at least an outer surface of the neck mold to at least the crystallization temperature and means for heating an inner surface of the neck to at least the crystallization temperature for crystallizing the neck.

20. The preform molding apparatus according to claim 17 wherein the at least one heating station includes means for heating the neck molds to heat at least an outer surface of the neck molds to at least the crystallization temperature and means for heating an inner surface of the neck to at least the crystallization temperature for crystallizing the neck.

21. The method according to claim 18 wherein in said step of heating, the neck is also heated to said crystallization temperature at its inner surface.

22. The perform molding apparatus according to claim 14 wherein the at least one heating station for heating includes means for heating an inner surface of the neck to the crystallization temperature.

23. The perform molding apparatus according to claim 17 wherein the at least one heating station for heating includes means for heating an inner surface of the neck to the crystallization temperature.

* * * * *